United States Patent [19]
Alberts

[11] 4,082,470
[45] Apr. 4, 1978

[54] CONNECTOR

[75] Inventor: Heinrich-Albert Alberts, Mondeor, Transvaal, South Africa

[73] Assignee: Serbert Industries (Proprietary) Limited, Mondeor, Transvaal, South Africa

[21] Appl. No.: 773,790

[22] Filed: Mar. 2, 1977

[30] Foreign Application Priority Data

Mar. 12, 1976 South Africa ............... 76/1548

[51] Int. Cl.² .................................... F16B 2/16
[52] U.S. Cl. ........................... 403/172; 403/295; 403/7
[58] Field of Search ............... 403/3, 4, 7, 8, 12, 403/13, 14, 22, 171, 172, 173, 174, 176, 177, 178, 295, 292, 260, 258

[56] References Cited

U.S. PATENT DOCUMENTS

| 1,307,551 | 6/1919 | Jackson | 403/175 |
| 1,840,048 | 1/1932 | Michelman | 403/13 |
| 3,198,561 | 8/1965 | Smith | 403/7 |
| 3,314,699 | 4/1967 | Taylor | 403/14 |
| 3,574,510 | 4/1971 | Herman | 403/8 |
| 3,632,147 | 1/1972 | Finger | 403/171 |

FOREIGN PATENT DOCUMENTS

| 2,403,358 | 7/1974 | Germany | 403/171 |
| 188,408 | 3/1964 | Sweden | 403/295 |
| 1,008,031 | 10/1965 | United Kingdom | 403/176 |

Primary Examiner—Andrew V. Kundrat
Attorney, Agent, or Firm—Young & Thompson

[57] ABSTRACT

A variable connector for interconnecting lengths of tubing to form frameworks. The connector consists of a central body member having a number of attachment points formed thereon and a series of separate connector members which are adapted to be releasably secured to desired attachment points on the body member by means of screws or the like. Any one of a number of possible connector configurations may therefore be obtained merely be securing the required number of connector members to the required attachment points on the body member.

1 Claim, 5 Drawing Figures

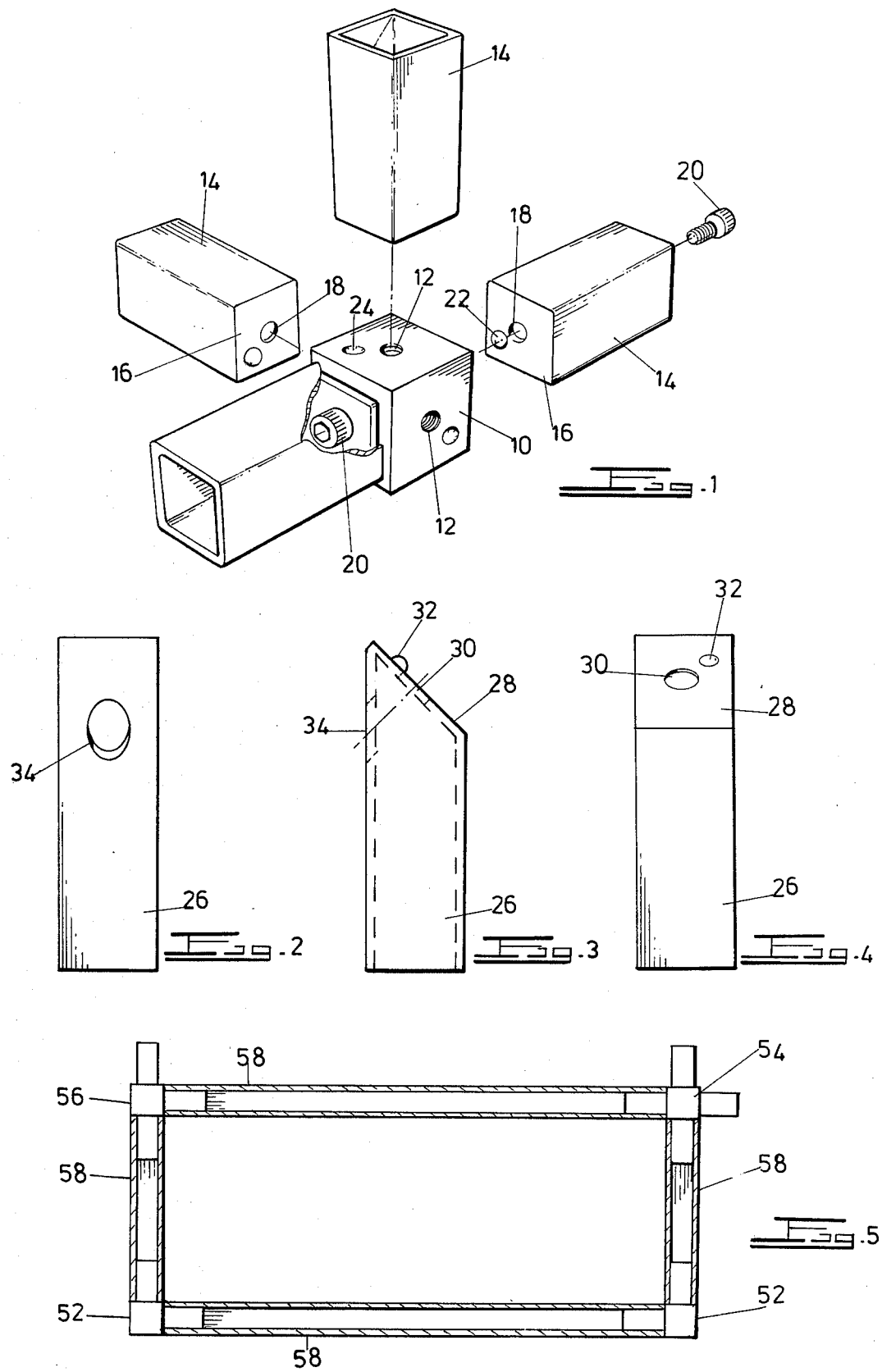

CONNECTOR

This invention relates to connectors for interconnecting lengths of tubing of square or other cross section to form frameworks.

Connectors of the type described above are of course known but, to the best of the applicant's knowledge, all of the known connectors are integrally formed units. Since it is frequently necessary to provide for a plurality of possible connector configurations (such as, for example, T's, L's and cross pieces) this means that the manufacturer of these known connectors has to allow for the manufacture of each of these possible connector configurations. This can be a costly exercise. In addition the necessity for various connector configurations makes it difficult to pack and transport such connectors.

It is an object of the present invention to provide a new type of connector of the type described above but which eliminates the problems set out above.

A connector according to the invention comprises, in combination, a central body member having a plurality of attachment points thereon, and a plurality of separate connector members adapted to be releasably secured to desired attachment points on the central body member to provide any one of a number of possible configurations, each connector member being, in turn, adapted to be releasably connected to a length of tubing.

Further according to the invention the attachment points on the central body member are threaded holes, and each connector member is adapted to be releasably secured to the central body member by means of a screw which engages with one of the threaded holes.

Further according to the invention each connector member is hollow in order to accommodate its associated screw.

Further according to the invention a formation is formed on the central body member adjacent each of the threaded holes, and each connector member is provided with a complemental formation adapted to engage one of the formations on the central body member to prevent axial rotation of the connector member on the central body member.

Further according to the invention the central body member is a cube made of any suitable material, and the threaded holes are formed in each of the faces of the cube.

To illustrate the invention an embodiment thereof is described herewith with reference to the accompanying drawing in which:

FIG. 1 shows a perspective view (partly exploded and partly in section) of the connector of the invention in one configuration thereof;

FIGS. 2 to 4 show a second type of connector member; and

FIG. 5 illustrates how the connector is used.

With reference to the drawings the connector of the invention comprises a central cube 10 which may be made out of aluminium. A threaded hole 12 is formed centrally in each of the six faces of the cube 10.

The connector illustrated in the drawings is of the type which can be used to connect together lengths of square tubing but the invention is of course applicable to the connection of tubes of other cross sections as well. With further reference to the drawings therefore the connector further comprises a number of identical socket portions 14 of square cross section. The socket portions may conveniently be made out of sheet metal and are closed at one end 16 thereof.

A hole 18 is formed in the closed end 16 of each of the socket portions 14.

In use the socket portions 14 are secured to the cube 10 by means of suitable screws 20 which pass through the holes 18 and are secured in the threaded holes 12 in the sides of the cube 10. It follows therefore that any one of a number of possible connector configurations can be achieved simply by securing the required number of socket portions 14 to the cube 10 in the appropriate positions. For example, the connector can be assembled to provide a corner, double corner, double cross, T, centre cross, corner cross, etc. Once the connector has been assembled in the required configuration the tubing to be connected is merely slipped over the socket portions 14.

In order to prevent axial rotation of the socket portions on the cube 10 a dimple 22 is formed on the external surface of the closed end 16 of each socket portion 14, and a complemental recess 24 is formed in each of the sides of the cube 10. Thus, when the socket portions 14 are secured to the cube 10, care must be taken to engage the dimples 22 with the recesses 24.

It will be appreciated that the connector as described above comprises only two basic elements, namely, the cube 10 and the socket portions 14, and that manufacture, packing and transport of this connector will therefore be substantially cheaper and easier than has hitherto been possible. The connectors could, for example, be transported to the site in their disassembled condition, and assembled on site into their required configurations.

Although the connector as described above is capable of a substantial number of possible configurations it is limited to the assembly of structures in which the tubes extend from each connector mutually perpendicularly to one another. It is sometimes desirable to create structures in which some of the tubes subtend an angle of about 45 degrees with the other tubes. To this end therefore the connector of the invention provides a second type of socket portion which is illustrated in FIGS. 2 to 4 of the accompanying drawing.

With reference to FIGS. 2 to 4 there is provided a different type of socket portion 26, the closed end 28 of which is bevelled. As in the first type of socket portion 14, a hole 30 is provided centrally in the closed end 28 and a dimple 32 is formed on the external surface of the closed end 28. In addition an opening 34 is formed on one of the sides of the socket portion 26 to enable a screw driver or the like to be passed therethrough in order to secure the screw 20 in the required hole 12 in the cube.

Alternatively, the cube could be formed with one or more inclined faces, and the first-mentioned type of socket portion 14 could be attached to the inclined face.

FIG. 5 illustrates a simple framework using the connectors of the invention. The drawing shows two L-type connectors 52, a cross-type connector 54 and a T-type connector 56 for interconnecting the tubing 58.

I claim:

1. A connector for interconnecting lengths of square tubing to form frameworks comprising, in combination, a three-dimensional central body member having a plurality of facets in each of which is formed a threaded bore, and a plurality of separate connectors adapted to be releasably secured by said bores to selected facets on the body member to provide any one of a number of possible configurations, the connector members in turn being adapted to be releasably connected to the lengths of square tubing, characterized in that:
(a) each connector member is a hollow tube, of square cross section throughout its length and closed at one end by a wall;
(b) a central hole is formed in the end wall of each connector member to accept a screw by means of which the connector member may be secured to the central body;
(c) each connector member is adapted to accommodate the head of the screw within it;
(d) a recess is formed in each facet adjacent its threaded bore and radially spaced therefrom;
(e) the external face of the end wall of each connector member is formed with a complementary protuberance adapted to engage one of the recesses on the central body to prevent rotation of the connector member when secured to the central body.

* * * * *